Dec. 8, 1959  H. G. ANDRE  2,916,686
CHARGER-CONTROL APPARATUS FOR ELECTRIC BATTERIES
Filed April 19, 1956
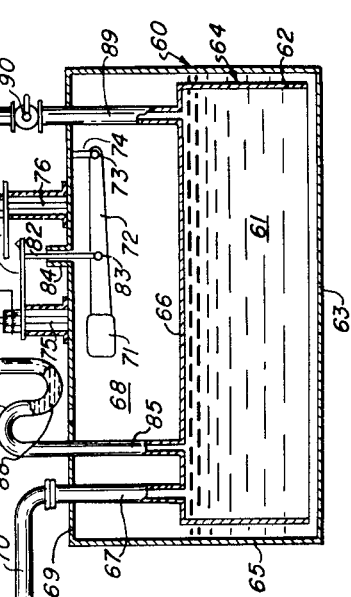
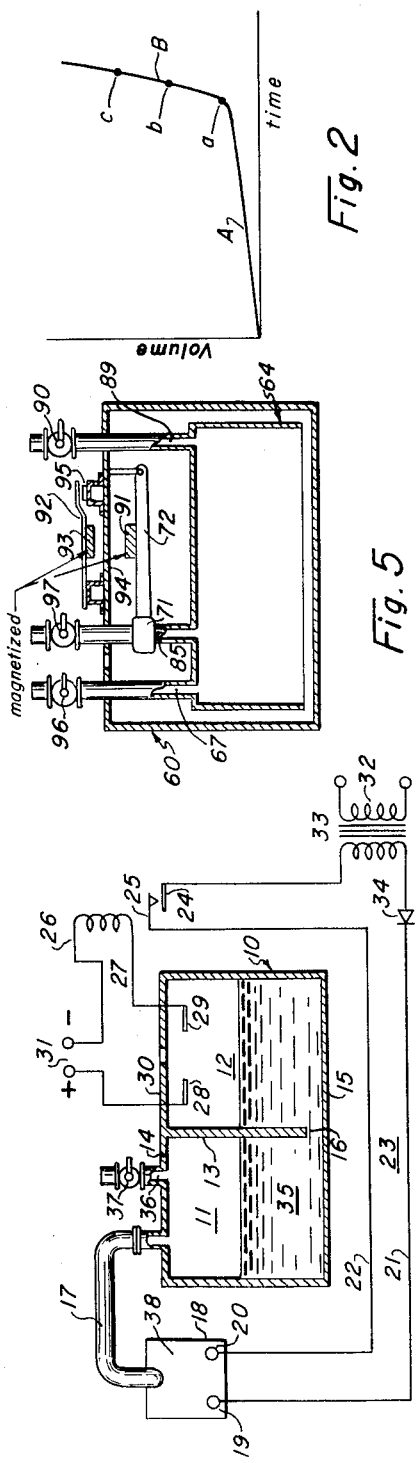
INVENTOR:
HENRI GEORGES ANDRÉ
BY Ely Silverman
ATTORNEY

United States Patent Office 2,916,686
Patented Dec. 8, 1959

2,916,686

CHARGER-CONTROL APPARATUS FOR ELECTRIC BATTERIES

Henri G. Andre, Montmorency, France, assignor to Yardney International Corp., New York, N.Y., a corporation of New York Application April 19, 1956, Serial No. 579,179

Claims priority, application France April 21, 1955

12 Claims. (Cl. 320—46)

The present invention relates to an apparatus for controlling a battery charger in such a manner as to interrupt its operation automatically when the battery connected to it has reached its saturation charge. More particularly, it relates to a charger-control apparatus for electric batteries of the type wherein no or only a negligible amount of gas is released during normal charging, i.e. in the course of a reversible electrochemical reaction generally involving the reduction of an oxide at a negative electrode and the oxidation of a metal at a positive electrode; when the last-mentioned metal has been fully oxidized, further passage of current leads to irreversible dissociations accompanied by vigorous gassing. An alkaline silver-zinc accumulator is representative of the type of battery referred to.

Unless the charging operation is interrupted at the proper time, there is the risk not only of a deterioration of the battery itself but also of a violent explosion liable to cause widespread destruction. Prior charge-control devices, utilizing the increase in pressure due to gas evolution, required the use of substantially air-tight containers in combination with more or less complicated manometric systems adapted to operate a circuit breaker in response to an abrupt pressure rise. Such arrangements were not always satisfactory, especially if designed for larger batteries which had to be disposed within an air-tight receptacle of considerable size; moreover, barometric fluctuations, changes in altitude and other internal and external conditions had to be taken into account when adjusting the device to respond to a critical difference between the pressure of the gas and that of the surrounding atmosphere.

The general object of the present invention is to provide an apparatus of the character set forth which is free from the drawbacks noted above, simple in construction and accurate in operation.

According to an important feature of the invention, there is provided, in a charge-control apparatus for the purpose described, a volumetric deactivator system connected by a pneumatic conduit to the interior of the battery to be charged, or preferably of a single cell thereof, this system including means for interrupting the operation of a battery charger in response to the development of a predetermined volume of gas under atmospheric or near-atmospheric pressure.

More particularly, the volumetric system of an apparatus according to this invention may comprise a pair of chambers communicating with each other by way of a narrow passage, the first chamber being pneumatically connected to the battery or cell and containing a liquid which, upon being partially or totally transferred to the second chamber by the pressure of the developing gases, actuates a suitable control device, such as a circuit-breaker arrangement, to discontinue charging of the battery.

The control of the volumetric circuit-breaker system from a single cell of the battery to be charged enables an apparatus of limited size to be used even for multi-cell batteries of large dimensions and introduces a desirable safety factor in that all other cells of the battery can be arranged to discharge their gases more or less freely into the atmosphere, thereby minimizing the danger of an explosion in the case of improper operation of the charger or its deactivator; it should be noted, however, that even the gas used to operate the deactivator, being confined only by a displaceable body of liquid, will be able to escape harmlessly if for any reason the charging current is not cut off at the proper time. Since the state of charge of a single cell generally reflects that of the battery as a whole, the control of a charger by such single cell is entirely acceptable; in a silver-zinc battery, in particular, the voltage across the terminals will remain relatively low until every one of the several parallel-connected cells thereof has been substantially fully charged, whereby rapid gas evolution will not set in prematurely even if the selected cell is of somewhat lower capacity than the others.

The invention will be described in greater detail with reference to the accompanying drawing in which:

Fig. 1 is a somewhat diagrammatic view of a charge-control apparatus according to a first embodiment of the invention;

Fig. 2 is a graph showing, for a typical silver-zinc battery, the volume of evolved gas plotted against duration of charge; and Figs. 3, 4 and 5 are diagrammatic views, similar to Fig. 1, of further embodiments.

According to Fig. 1 there is provided a casing 10 subdivided by a vertical partition 13 into two chambers 11 and 12; partition 13 depends from the top 14 of the casing and is spaced by a small gap 16 from its bottom 15, thereby forming a restricted passage between the two chambers 11, 12. Chamber 11 communicates by way of a tube 17 with the battery 18, preferably with a single cell 38 thereof; the terminals 19 and 20 of this battery are connected to respective conductors 21, 22 forming part of a charging circuit 23 which includes an interrupter formed by the back contact 24 and the armature 25 of an electromagnetic relay 26. This relay is connected in an energizing circuit 27 which includes a pair of spaced-apart contacts 28, 29, suspended from the top 30 of chamber 12, and also the terminals 31 of a source of operating current which, if desired, may be the battery 18 itself. Charging current is supplied to circuit 23 from a source 32 of alternating current by way of a transformer 33 and a rectifier system indicated schematically at 34. An electrically conductive liquid 35, such as tap water, is present in both chambers 11 and 12 of casing 10. A vent 36 on casing top 14 contains a valve 37 for connecting chamber 11 with the atmosphere after the charging operation has been stopped.

The operation of the system of Fig. 1 is as follows:

The dimensioning of the chambers 11 and 12, the position of the contacts 28, 29 and the amount of liquid 35 are so selected that the liquid level in chamber 12 will reach these contacts at the instant when a predetermined volume of gas, corresponding to saturation charge of battery 18, has entered chamber 11 from cell 38 by way of tube 17. After this quantity of gas has been evolved, the liquid 35 bridges the contacts 28, 29 and closes the energizing circuit for relay 26, thereby opening the charging circuit 23 for battery 18. With the liquid in chamber 12 initially at atmospheric pressure, and with the top 30 of chamber 12 apertured to prevent the build-up of a counterpressure by the compression of entrapped air therewithin, the ultimate pressure of the evolved gas will have to exceed atmospheric pressure only enough to balance the difference between the liquid levels of the two chambers; the presence of air vents at the top of chamber 12 will also be desirable as a safety measure to enable the escape of excess gas if the relay 26 should fail to open the charging circuit 23. (The same considerations apply to the analogous chambers 41 and 68 of the embodiments described hereinafter.)

From the graph of Fig. 2 it will be seen that the total volume of released gas rises slowly at first, over a portion A of the curve shown, and then increases rapidly as indicated by the portion B; the junction between these two portions indicates the end of the normal charge and the beginning of the overcharge. Thus, with a typical silver-zinc accumulator, the points $a$, $b$ and $c$ of the curve may correspond, for example, to terminal voltages of 2.00, 2.02 and 2.04 volts, respectively, which indicates the close agreement between gas volume and state of charge upon which the great sensitivity of the present device is based.

The momentary opening of valve 37 enables the rapid venting of chamber 11 and the restoration of liquid 35 to its original level preparatorily to the next use of the device.

In the modification of Fig. 3 there is shown a container 40 divided into an upper chamber 41 and a lower chamber 42 by a horizontal partition 43 having several orifices 44, 45 and 51. A tube 46, rising from orifice 44, traverses the top 47 of the container and is joined to the gas inlet tube 17 leading to the battery to be charged. A tube 48 descends from orifice 45 and terminates short of the bottom 50 of the container to define a restricted passage 49 for the liquid inside lower chamber 42. A third tube 52 rises from orifice 51 and, after passing through container top 47, opens into the atmosphere, this tube being normally closed, in the same manner as venting tube 36 of Fig. 1, by a valve 53. Contacts 54 and 55, positioned within upper chamber 41, form part of an energizing circuit 56 for a circuit-breaker relay (not shown) similar to relay 26 of Fig. 1, this circuit including the terminals 57 of a source of operating current. The operation of this embodiment is similar to that of Fig. 1 and will be readily understood.

In Fig. 4 an outer shell or casing 60 defines a chamber 68 and surrounds an inner shell or vessel 64 which is open at the bottom and defines a second chamber 61. The lower edge 62 of vessel 64 is narrowly spaced from the bottom 63 of casing 60 to define a restricted passage for liquid from chamber 61 into chamber 68; this liquid is normally present only in chamber 61 and in the narrow annular space between inner shell 64 and the side walls 65 of outer shell 60. A tube 67, opening into chamber 61 through the top 66 of vessel 64, traverses the top 69 of container 60 and connects with an inlet tube 70 corresponding to conduit 17 of the preceding embodiments. A venting tube 89, similar to tube 52 of Fig. 3, rises from top 66 and traverses top 69, being provided with a valve 90 for connecting chamber 61 with the atmosphere.

A float 71 is carried on the free end of a lever 72 which is pivoted at 73, within chamber 68, on an arm 74 depending from chamber top 69. A pair of terminals 75 and 76, rising from chamber top 69, carry a pair of contact springs 77, 78, respectively, which are normally spaced apart and are permanently connected to respective conductors 80, 81 of an energizing circuit 79 for a circuit-breaker relay (not shown) analogous to relay 26 of Fig. 1. A link 82 is attached to contact spring 77 and, after passing through a boss 84 on container top 69, engages the lever 72 at 83; it will be noted that boss 84 also forms a connection between chamber 68 and the atmosphere for the purpose previously specified. A further tube 85, rising from top 66 of vessel 64, passes through top 69 and terminates in a gooseneck whose descending and ascending branches 86, 87 are transparent and contain a suitable manometric liquid 88, such as mercury.

In operation, with valve 90 in its normal, closed position, gases entering through tube 70 will displace some of the liquid in chamber 61 and cause it to occupy part of chamber 68, thereby eventually raising the float 71; this action brings contact spring 77 into engagement with contact spring 78, thereby closing the energizing circuit 79 and operating the circuit-breaker relay thereof. The position of the mercury filling 88 in manometer tube 85 enables ready ascertainment of the water level within chamber 68 even if shell 60 is completely opaque. Ultimately, the system is restored to normal by the temporary opening of valve 90.

The arrangement of Fig. 5 is somewhat similar to that of Fig. 4 and like reference numerals have been used to designate elements common to both embodiments. Entrance tube 67 and manometer tube 85 have here been shown provided with respective shut-off valves 96 and 97 which might, of course, also be present in the other embodiments and which, together with valve 90 and such other valves as might be necessary to close any aperture present in container top 94, serve to render the device spillproof during transportation. Link 82 of Fig. 4 has been removed and lever 72 carries, instead, a permanent bar magnet 91 facing a similar magnet 93 which is mounted above top 94 on a contact spring 92. A stationary contact element 95 co-operates with spring 92 to close an energizing circuit for a circuit-breaker relay (not shown) when spring 92 is depressed. Normally, this spring remains in its open-circuit condition illustrated, the magnet 91 being unable to attract magnet 93 effectively as long as lever 72 is in its original position. When, however, a rise in liquid level acts upon float 71 to raise lever 72, magnet 91 strongly attracts magnet 93 and causes spring 92 to engage contact element 95, thereby completing the energizing circuit for the circuit-breaker relay.

Various modifications of the embodiments hereinabove disclosed are, of course, possible without departing from the spirit and scope of the invention as defined in the appended claims.

I claim:

1. Apparatus for inactivating a battery charger in response to a rapid increase in the volume of gas developed by a battery in process of charging, comprising a stationary casing provided with a first and second stationary chamber and with a restricted passage extending from said first to said second chamber, a liquid normally present in at least said first chamber, said passage being continuously occupied by said liquid, inlet means at said first chamber for admitting gas from said battery into said first chamber, thereby displacing part of said liquid from said first into said second chamber, control means for interrupting the operation of the battery charger, and actuating means for said control means adapted to become effective upon said liquid reaching a predetermined level in said second chamber.

2. Apparatus according to claim 1, comprising a vertical partition in said casing separating said chambers from each other.

3. Apparatus according to claim 1, comprising a horizontal partition in said casing separating said chambers from each other.

4. Apparatus according to claim 1, comprising an inner shell within said casing open at the bottom and defining said first chamber.

5. Apparatus according to claim 1, comprising venting means for temporarily connecting said first chamber with the atmosphere.

6. Apparatus according to claim 1, wherein said second chamber is in permanent communication with the atmosphere.

7. Apparatus according to claim 1, wherein said liquid is electrically conductive, said control means comprising a normally open energizing circuit adapted to be closed by said actuating means, said actuating means comprising a pair of spaced-apart contacts positioned in said second chamber above the normal liquid level thereof.

8. Apparatus according to claim 12, wherein said operating means comprises link means mechanically connecting said movable member with one of said contacts.

9. Apparatus according to claim 12, wherein said operating means comprises two magnetic elements carried on said movable member and on one of said contacts, respectively, said elements being adapted to exercise strong mutual attraction upon a lifting of said float means by said liquid.

10. Apparatus according to claim 12, wherein said movable member is a pivoted lever.

11. Apparatus according to claim 1, comprising manometer means connected with said first chamber.

12. Apparatus for inactivating a battery charger in response to a rapid increase in the volume of gas developed by a battery in process of charging, comprising a casing provided with a first and a second chamber and with a restricted passage extending from said first to said second chamber, a liquid normally present in at least said first chamber, said passage being continuously occupied by said liquid, inlet means at said first chamber for admitting gas from said battery into said first chamber, thereby displacing part of said liquid from said first into said second chamber, control means for interrupting the operation of the battery charger, said control means adapted to close said energizing circuit upon said liquid reaching a predetermined level in said second chamber, said actuating means comprising a movable member provided with float means positioned above the normal liquid level in said second chamber, said energizing circuit including a pair of contacts and operating means controlled by said movable member to close said contacts upon said float means being lifted by the liquid.

References Cited in the file of this patent

UNITED STATES PATENTS

| | | |
|---|---|---|
| 406,981 | Amory | July 16, 1889 |
| 1,187,148 | Hutchison | June 13, 1916 |
| 1,605,020 | Woodbridge | Nov. 2, 1926 |
| 1,705,673 | Menzies | Mar. 19, 1929 |
| 2,437,488 | Ulanet | Mar. 9, 1948 |